Dec. 19, 1944.  G. D. ARNOLD  2,365,240
TREATING AND STORING DEVICE
Filed May 20, 1942
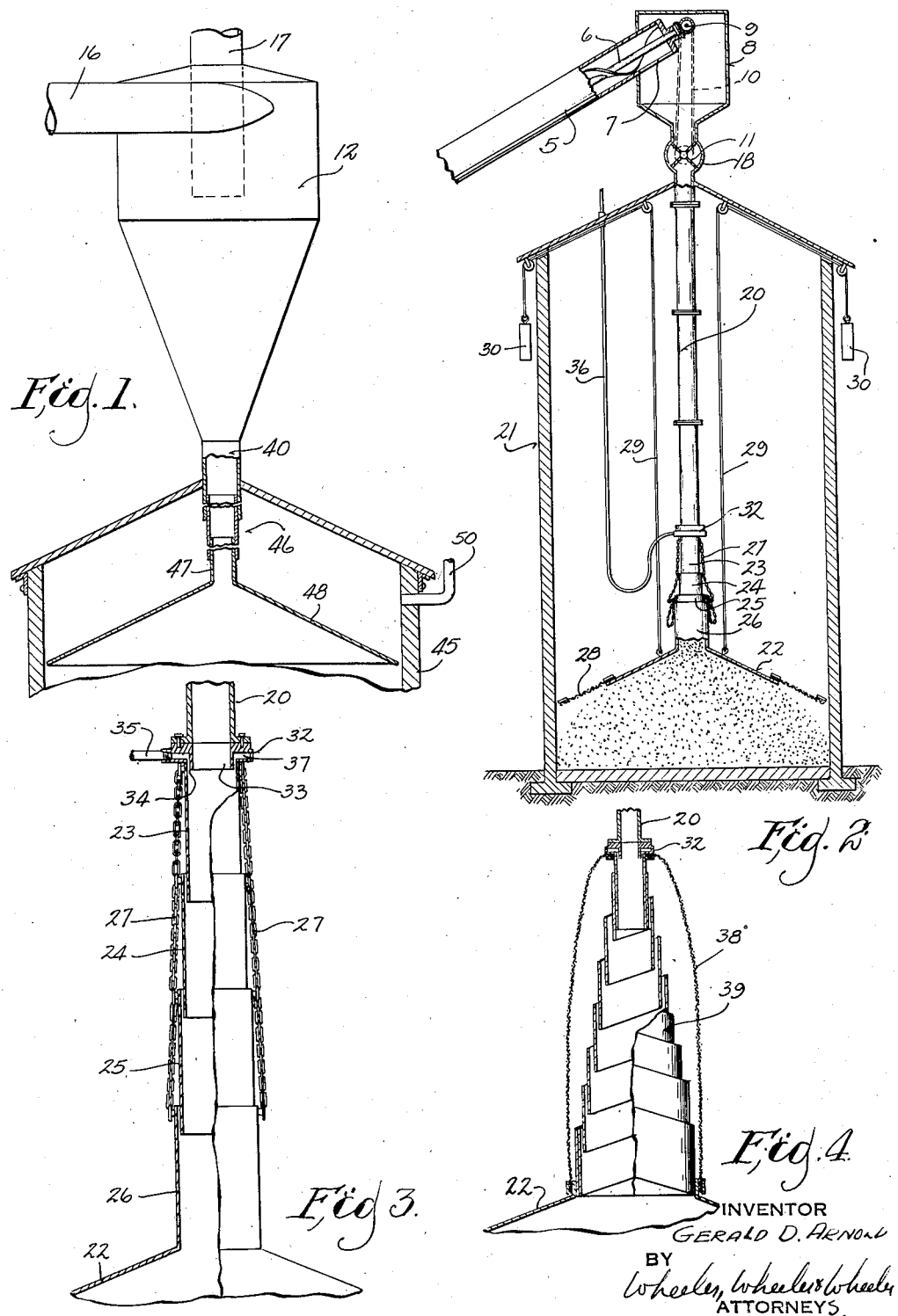
INVENTOR
GERALD D. ARNOLD
BY
Wheeler, Wheeler & Wheeler
ATTORNEYS

Patented Dec. 19, 1944

2,365,240

UNITED STATES PATENT OFFICE 2,365,240

TREATING AND STORING DEVICE

Gerald D. Arnold, Wauwatosa, Wis.

Application May 20, 1942, Serial No. 443,739

1 Claim. (Cl. 214—17)

This invention relates to improvements in treating and storing devices. The present application is a continuation in part of my application 361,807 filed October 19, 1940 and entitled "Art of preserving elements of organic materials." The present application contains claims divided from the above entitled application pursuant to official requirement.

A primary object of the invention is to maintain a treating fluid of any nature (particularly a gaseous fluid) in intimate contact with solid particles treated thereby during and subsequent to the treatment and while such particles are in transit to storage and, so far as practicable and desirable, to maintain such fluid as a permanent environment of the treated particles during storage.

One of the objects of the present invention is to provide for mass storage of materials such as organic products, including vitamin-containing foods, which, for one reason or another, are not usually stored in bulk. Some products, heated during processing, should not be stored in bulk while retaining processing heat because they rapidly lose carotene or other vitamin content, and consequently their prime value as food, when stored hot. Other materials tend to ferment or to become spoiled through the growth of mold. The present invention provides a means for treating and storing the material in transit and in bulk storage while inhibiting deterient factors, whatever these may be.

With the elimination of factors tending to cause deterioration there are important advantages in bulk storage. With respect to some products, the larger the mass the better the product can be preserved. Particularly where temperatures other than atmospheric are involved, the large mass will tend to maintain either super-atmospheric or sub-atmospheric temperatures for long periods. For this reason, where the product is to be refrigerated or heated during storage, it is much easier to change its temperature before it reaches storage than to change its temperature after the material is in mass storage.

While mass storage may be either in bulk or in sacks, it is sometimes advantageous to store in bulk where the product can be handled more easily in bulk than in sacks and where the cost of sacks tied up during long periods of storage is an important item.

More specifically, it is an object of the present invention to provide means for delivering material into the storage chamber, either with or without treatment, which will preserve the material quite largely from contact with atmospheric air during the period of delivery and storage, thereby permitting the material in the storage chamber to remain in the condition in which it is delivered. I seek to accomplish these results by the provision of a delivery pipe, at least a portion of which is adapted to shorten during delivery, the delivery pipe terminating in a hood which covers the delivered material in the storage chamber to exclude atmospheric air therefrom and is suitably counterbalanced or otherwise arranged to be raised by the pressure of material beneath it as such material is delivered.

It is a further object of the invention to provide for the simultaneous treatment of the material enroute to the chamber and the charging of the material with the treating fluid, whether such fluid be gaseous or liquid.

Other objects will be made apparent to those skilled in the art by scrutiny of the following disclosure of the invention.

In the drawing:

Fig. 1 is a view partially in side elevation and partly in axial section, fragmentarily illustrating a storage receiver and means for delivering material thereto.

Fig. 2 is a view in axial section showing a modified embodiment of the invention.

Fig. 3 is a fragmentary detail view on an enlarged scale showing the telescopically contractile pipe through which final delivery is achieved in the device of Fig. 2.

Fig. 4 is a fragmentary detail showing a different construction of telescopically contractile pipe.

Like parts are identified by the same reference characters throughout the several views.

The device shown in Fig. 1 is identical with the disclosure of the parent application above identified, and the same reference characters will be used in referring to it.

The device shown at 12 is a centrifugal separator of the "cyclone" type having a tangential inlet at 16 and a central outlet for gases at 17. Solids pneumatically conveyed into the separator through the inlet 16 are separated centrifugally from the gases and fall into the bottom of the separator for discharge through a spout 40 which leads into a silo-like receiver or storage bin at 45. Connecting the spout 40 with the interior of the receiver 45 through the roof thereof, is a telescopically extensible pipe 46 comprising separate slidable sections, the lowermost section 47 of which connects to a float 48 in the form of an inverted funnel beneath which the material delivered from the separator into the storage chamber is packed to gradually raise the funnel 48 as the silo fills. The lifting movement of the funnel is accommodated by the telescopic collapse upon each other of the tubular sections of the extension pipe 46.

In the above identified parent application the material treated was organic material which was refrigerated in the course of being pneumatically conveyed in a non-oxidizing atmosphere of carbon dioxide gas. The refrigerated carbon dioxide gas, upon being separated from the organic material, was returned through the pipe 17 to the refrigerating apparatus for reuse. A certain percentage of such gas, however, remained entrained with the organic solids to be carried thereby into the storage chamber 45 to create an atmosphere of carbon dioxide permanently excluding the air from the material during storage. Such gas tends to remain in any closed storage container by gravity unless diluted by air currents. Such dilution is precluded by the floating hood 48 during the filling operation.

The same arrangement may be used for any other treating operation regardless of the material treated or the fluid employed in the treatment. The material will ordinarily comprise particles of small size either naturally or by reason of previous comminution. It may, however, be powdered or ground, or crushed, or in the form of meal or it may comprise whole cereal grains or other undivided objects. The purpose of treatment may be to prevent or to incur oxidation, to induce or to prevent chemical action, to cool or to heat the product, to preserve nutritive or fertilizing elements in the product, to kill live organisms, to sterilize the product against enzymatic action, to moisten the product or to remove moisture therefrom, or many other objectives. For these numerous purposes air or steam or carbon dioxide or chemicals or insecticide or bactericides or any other liquids or gases or vapors may be employed and, as will be obvious to those skilled in the art, the gases, vapors or liquids may be either hot or cold or inert or active chemically, according to the purpose desired.

In the embodiment shown in Fig. 2 the material is mechanically, rather than pneumatically, conveyed into position for storage and treatment. It is lifted through tube 5 by screw conveyor 6 to a discharge port at 7 through which the material is released into the closed hopper 8. The upper end of the screw is geared to a cross shaft 9 connected by chain 10 with a conventional rotary charging valve 11 in a cylindrical casing 18.

Below the charging valve the material passes downwardly through a delivery tube and treating conduit 20 which is preferably made in sections flanged to be conveniently connected and disconnected as required during the filling of the storage chamber 21. The last section of the conduit 20 serves to connect the conduit with the float 22, corresponding to the float shown at 48 in Fig. 1. This last section of conduit 20 is shown in detail in Fig. 3 and comprises telescopically related sections 23, 24, 25 and 26 progressively increasing in diameter from top to bottom. Chains or other flexible connectors 27 extend along the sides of the sections and are connected to the top of each to preclude their separation. As the sections collapse the flexible connectors 27 are likewise collapsed. Instead of the chain connectors shown in Fig. 3, a flexible apron type connector of cloth, treated or untreated, or rubber or other suitable material, may be used as indicated in Fig. 4.

The floating hood 22 may, as indicated in Fig. 2, be of less diameter than the storage chamber 21, at least so far as its imperforate central portion is concerned. In that event it may be provided with an annular screen extension 28 into close fitting proximity to the wall of the chamber. While the extension is indicated as annular and the chamber may be assumed to be circular, it will be apparent that all of the parts may be either circular in cross section or may have any other desired cross section, the form being immaterial to the invention.

The weight of the floating hood 22 and the collapsible sections mounted thereon may be balanced to any desired extent by the counterweight ropes 29 and counterweights 30, it being intended that in normal operation the weight of the material delivered by gravity through the tube 20 will be sufficient to pack such material beneath the hood 22, thereby raising the hood. As the hood is raised to the point that all of the several collapsible sections 23, 24, 25 and 26 have been collapsed, the operation will be stopped long enough to enable the operator to remove one of the non-collapsible sections of the conduit 20, thereby shortening the conduit sufficiently to enable the collapsible sections to be re-extended for further filling operation.

The shape or pitch of the hood may have to be varied to a greater or lesser angularity according to the nature of the material and the wedging flow of which it is capable.

The filling conduit 20 may itself comprise a treating chamber and simultaneously the fluid used in the treatment may be delivered into the storage bin to create an atmosphere in which the material treated will remain permanently during the storage period if desired. For this purpose a special fitting 32 (Fig. 3) will be interposed between the lower end of the sectional conduit 20 and the collapsible conduit sections. The fitting 32 has a central spout portion 33 which is a continuation of the conduit 20 and is sufficiently smaller than the top collapsible section 23 to provide an annular port at 34 through which the treating fluid may be introduced. The treating fluid, of any desired nature, is supplied through a pipe 35 and hose 36 to the annular recess 37 from which the annular port 34 opens into the path of the material. Since the gravity flow of the material through the pipe 20 will ordinarily be relatively slow there will usually be ample time for treatment of the material in the pipe by whatever fluid is thus introduced. Such fluid will displace the air and fill the interstices between the particles of material treated and, due to the hood 22 (which may either fit tightly within the storage bin 45 as shown in Fig. 1, or may have a foraminous margin as shown in Fig. 2) the treating fluid will be induced to remain quite largely in the mass of material treated thereby.

In Fig. 4 I have illustrated a modified form of collapsible pipe section. The treating or delivery conduit 20 remains unchanged, as does the fitting 32 for the injection of treating fluid as desired. Below this point the outside air is excluded by a flexible and collapsible tube 38 of treated fabric or the like, which is maintained distended to provide free movement of material by a collapsible volute spring 39 which serves as the only mechanical connection between the tube 20 and the hood 22. The latter may be of any desired construction either like to or different from those shown in Figs. 1 and 2. The volute spring serves to guide all of the solids from conduit 20 to a point beneath the hood without allowing such solids to come into direct contact with the enclosing fabric. In effect the fabric merely seals the crevices between successive coils of the expansible volute wound pipe section 39. Various other arrangements may be substituted for the major purposes of the invention.

While the treating fluid may be such as to be retained in the storage chamber 45 or 21 by gravity, it is contemplated that the storage chamber will ordinarily be permanently and hermetically sealed for the storage period to preserve the material treated in an environment substantially free of atmospheric air. Of course if the only treatment to which the material has been subjected is treatment with heated or chilled air, the sealing of the storage chamber may not be essential.

Likewise it will be non-essential if the material stored is of such a nature that it will not be harmed by the atmospheric air after preliminary treatment and initial storage in a special environment. Where the material is finely divided and the fluid used in treating it is either a liquid or a gas which is heavier than atmospheric air, the only possibility of heat, gas or chemical exchange between the atmosphere and such material has reference to the top surface of the material in storage, and under these circumstances also it may be unnecessary to seal the bin hermetically.

In fact, there may be conditions such that it is desired to expose the material at the top of the bin. The cover of the bin may be detached to remove the hood or to expose the material or for either or both of these purposes. Furthermore, it is contemplated that after the material has been given one type of treatment by fluid introduced into the conduit, or carried with the material into the bin from some previous treatment, a different treatment may be given in the bin by introducing into the top of the bin, above the material and fluid which has been delivered through the conduit, some fluid of a different nature. This may be done through the pipe 50.

I claim:

In a device of the character described, the subcombination which includes a conduit for solids, a hood, a collapsible conduit section between the conduit and the hood, a tubular extension of the conduit extending into said section, said section being of larger diameter whereby to provide an annular port about said extension, and a fluid connection to said port for the introduction of a treating fluid through said port into the path of material delivered through said conduit.

GERALD D. ARNOLD.